Aug. 19, 1941.  R. V. MORSE  2,253,041
RADIATOR GRILLE GUARD
Filed March 3, 1938  2 Sheets-Sheet 1

INVENTOR.

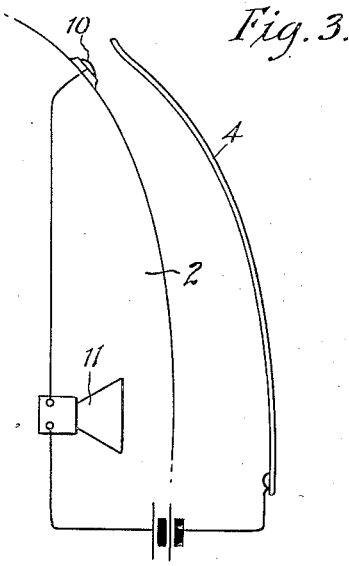
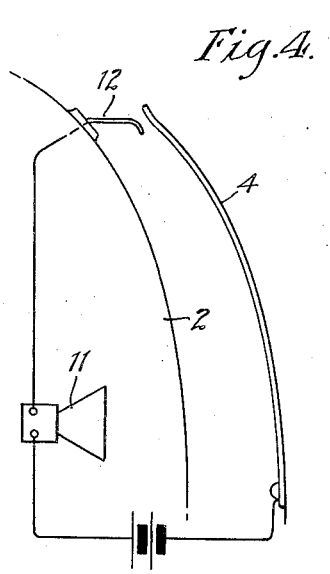
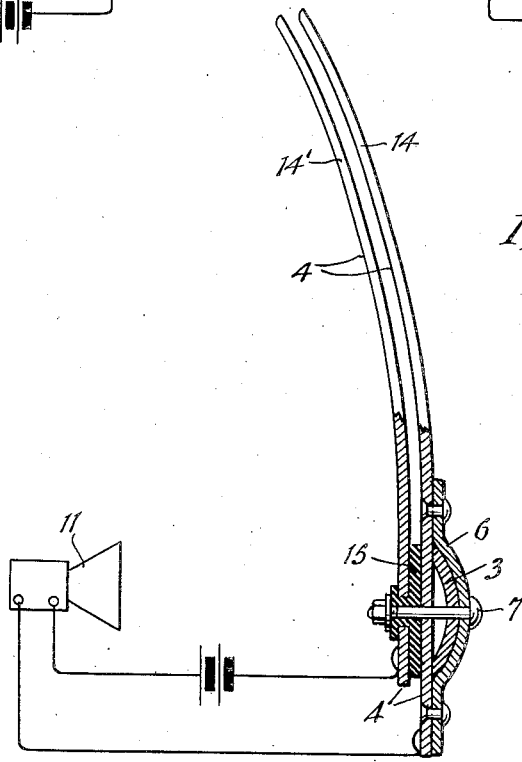
INVENTOR.
Robert V. Morse

Patented Aug. 19, 1941

2,253,041

UNITED STATES PATENT OFFICE 2,253,041

RADIATOR GRILLE GUARD

Robert V. Morse, Ithaca, N. Y.

Application March 3, 1938, Serial No. 193,688

3 Claims. (Cl. 293—55)

This invention relates to bumpers for automobiles and has for its principal object the prevention of damage to radiator grilles. In the modern automobile the decorative radiator grille is generally set considerably forward of the radiator itself, and is particularly vulnerable to damage above the zone protected by the ordinary bumper. Much of this damage is caused by relatively slow impacts of vehicles moving in and out of parking, a most common cause being the careless backing of delivery trucks whose tail boards project back and above the region protected by ordinary bumpers.

Various forms have been patented heretofore in which multiple bars extend from the cross bumper to approximately the top of the radiator, and while they may protect a radiator or grille better than the ordinary bumper extension, they have been cumbersome in appearance and difficult to install, the difficulty of installation being due to the fact that they required attachment to the frame of the car itself, as well as to the cross-bumper, and made the mounting on the cross-bumper suitable for straight impact rather than for torsion. As the average car owner refuses to drill his frame to attach unsightly braces, these prior high guards have been chiefly confined to trucks, and have not solved the problem for private cars.

In the present invention the portion of the bumper protecting the upper grille is so simplified and constructed that it may be designed to harmonize with the radiator grille, and is so mounted that the initial strains are primarily torsional through the regular bumper mountings, with free elastic flexure of the vertical extension during the first portion of a blow. If the impact becomes more serious, the vertical extension is arranged to come in contact with the top of the radiator grille, thus changing its action from a cantilever beam supported at one end to a beam supported at both ends, and greatly increasing its rigidity in the final emergency stages. In a further improved modification a horn is automatically sounded when the vertical extension is first bent, which in most cases of slow impact is sufficient to prevent damage.

From the foregoing it will be seen that the general objects of the invention are to provide a bumper or grille guard which may be readily attached; to simplify the construction, and make it capable of harmonizing with the lines of the car; to provide means for changing torsional resistance to a stiffer form in emergencies; and to provide automatic warning to a driver ahead if he starts backing carelessly. Various other objects will become apparent as the description proceeds.

Referring now to the drawings, Figure 1 is a perspective view of the improved bumper device, showing the grille guard in normal position.

Figure 3 shows one form of horn signal contact on the grille or radiator.

Figure 4 shows another form of horn signal contact, using a projecting wire.

Figure 5 illustrates a modification having the horn contact on the vertical bumper member or grille guard.

Similar reference numerals refer to similar parts throughout the various views.

Figure 1:
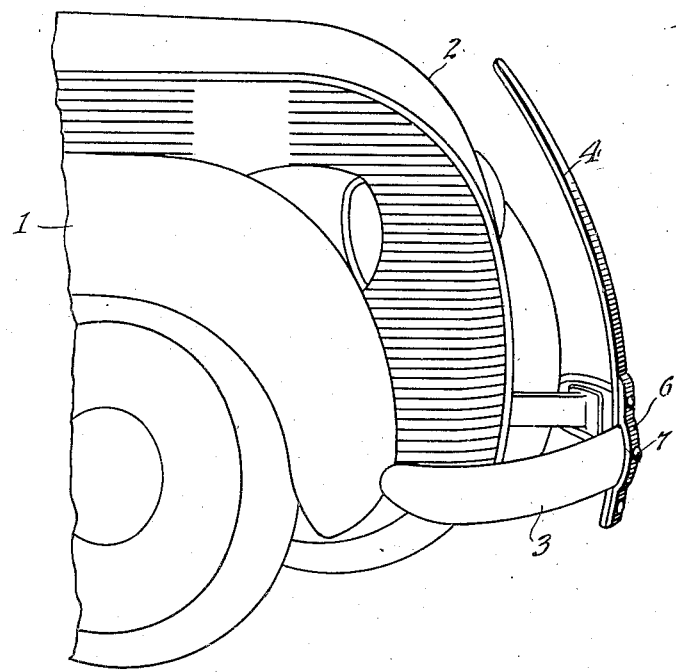

Referring now to Fig. 1, the car 1 having the nose or grille 2 is provided with a cross-bar bumper 3 secured to the front ends of the frame of the car in the usual manner. Extending vertically from the center of the cross-bar bumper 3 is the grille guard 4, which curves somewhat backward and reaches upward to substantially the level of the top of the hood or grille 2. The backward curve of the guard 4 may vary somewhat to harmonize with the contour of the nose of the car. The guard 4 is preferably of tempered steel similar to a leaf spring, with its broad face forward, and tapering upward to its tip. At the point near where it attaches to the cross-bumper 3, the flexible guard 4 is reenforced by a rigid bumper member 6, clamped on the cross-bumper 3, and extending vertically above and below the cross-bumper the usual distance that such supplementary rigid members ordinarily extend. Such rigid vertical bumpers 6 are designed to take direct impact without appreciable flexure, and their principal purpose has been to prevent the cross-bumper from hooking over or under the bumper of another car.

Figure 2:
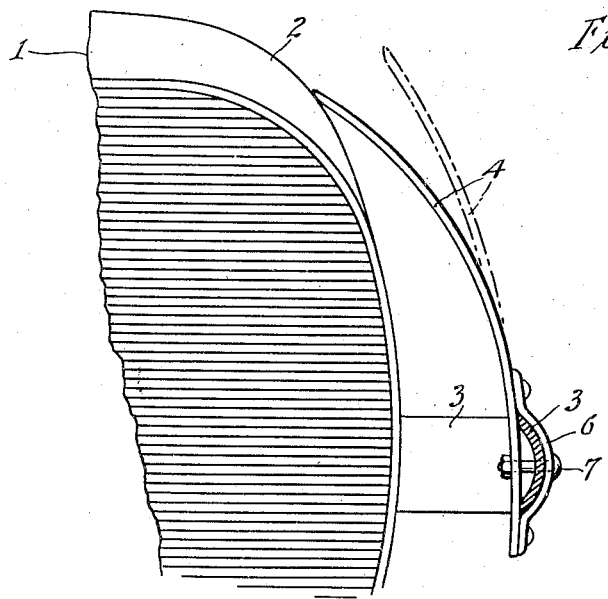
Figure 2 shows the grille guard bent back under impact to assume its secondary form, with clamped support at its lower end and frictional support at its upper end in contact with the grille.

Referring now to Fig. 2, which shows more clearly in cross-section one means of attaching the grille guard 4 to the cross-bumper 3, it will be seen that the bumper part 6 may be placed on the front of the cross-bar 3, the grille guard 4 on the back of the cross-bar 3, and all clamped together by the through bolt 7, so as to hold the assembly firmly as a unit, and permit the transmission of stresses from the guard 4 to the cross-bar 3, and thence torsionally to the frame of the car. In order to transmit the twisting stresses effectively to the cross-bar 3, the guard 4 should contact it at as widely vertically separated points as possible, as distinguished from some prior guards which have merely been attached along the top portion of the cross-bumper. Such top attachment has been permissible in prior guards, which were also fastened at their other ends to the radiator grille; but whereas in the present invention the guard reaches to the top yet is only supported at the lower end, it is highly desirable that a broad clamping base be provided. This can be reenforced by securing the guard 4 to the bumper part 6, or by merely clamping the guard 4 to the back of the cross-bar 3, provided the bar 3 is wide enough.

Any ordinary direct impact is taken by the member 6 or bumper 3 in the usual way, but if a vehicle having a high projecting rear such as a truck is encountered, the grille guard 4 intercepts the impact, and being relatively flexible, may possibly spring back far enough so that its tip strikes the top of the hood or grille 2, as shown in Fig. 2. In that event the rigidity of the guard 4 is greatly increased, and a considerable portion of the shock may go directly through the grille or hood 2, while the major portion goes through the frame by way of the cross-bumper 3. The original impact, however, is cushioned by the elastic forces transmitted in flexure through the blade of the guard 4, and torsionally through the cross-bar 3 to the frame.

The device is sufficiently strong to protect against the usual moderate impacts which have in the past frequently damaged grilles, such as when a truck backs into a parked car, or a preceding truck applies its brakes a little too suddenly. Much of the damage to grilles occurs in garages or parking, and as an additional protection a warning device may be connected as follows.

Referring now to Fig. 3, a horn button 10 may be mounted on the top of the hood or radiator grille 2, so that when the grille guard 4 is bent back against it as shown in Fig. 2, the horn 11 of the car will be sounded. Thus other drivers will be warned if they are carelessly backing, just as though the owner were on the alert, whether or not he is in his car.

A modification is shown in Fig. 4 consisting of a projecting wire 12, of rigid but flexible material such as hard drawn steel wire, which extends out from the hood 2 toward the guard 4 but does not ordinarily touch it. The horn 11 is wired so that when the wire 12 touches the guard 4, a circuit is completed through the bumper and frame of the car, to sound the horn. This operates somewhat quicker than the form shown in Fig. 3, as only a very slight deflection of the guard 4 is required to touch off the signal.

In the modification shown in Fig. 5, both horn contacts are put on the guard 4, either by using a button of the type shown in Fig. 3, or preferably, where two or more spring leaves 14 are used to build up the guard 4, one of these leaves 14' may be slightly separated and insulated at 15 from the adjacent one, and the horn circuit run through them so that when they are pressed together by an impact the horn 11 will be blown.

The horn signal may, of course, be thrown out of action when desired, as for example when pushing another car, by merely opening the electric circuit, as will be apparent to those skilled in the art.

While I have in the foregoing described particular embodiments of the invention, it will be understood that they are merely for purposes of illustration to make clear the principles thereof, and that the invention is not limited to the particular forms described, but is subject to various modifications and adaptations in different installations, as will be apparent to those skilled in the art, without departing from the scope of the invention as stated in the following claims.

I claim:

1. A grille guard for automobiles, comprising a flexible blade adapted to be secured to the middle of the front cross-bumper of an automobile and substantially at right angles thereto, said blade being curved to harmonize with the contour of the grille hood and extending upward to a height corresponding substantially to the top of the grille hood, said blade standing free of the grille hood under normal conditions, but being flexible enough under impact so that it may strike the grille hood and be partially supported thereby, while the primary impact is taken through the rigid connection to the cross-bumper, whereby the grille hood is guarded against high impacts.

2. A grille guard for automobiles, comprising a rigid impact member adapted to be secured substantially vertically across the front of a cross-bumper of an automobile, a flexible blade of greater length than said impact member and adapted to be secured substantially vertically across the back of said cross-bumper, said flexible blade being sufficiently long to extend substantially to the height of the grille hood, said blade standing free of the grille hood under normal conditions, but being sufficiently flexible under impact so that it may strike the grille hood and be partially supported thereby, while the primary impact is taken through the rigid connection to the cross-bumper whereby the grille hood may be guarded against high impacts.

3. A bumper for automobiles formed in substantially the shape of an inverted T, comprising a cross-bumper extending horizontally across the front of an automobile and an upstanding member secured to the middle of the cross-bumper and extending substantially as high as the top of the front hood of the automobile, said member normally standing free, supported by the cross-bumper but capable of bending under impact so as to contact the grille hood for additional support, whereby the grille hood may be guarded against high impacts.

ROBERT V. MORSE.